US011556874B2

(12) United States Patent
Deshpande et al.

(10) Patent No.: US 11,556,874 B2
(45) Date of Patent: Jan. 17, 2023

(54) BLOCK CREATION BASED ON TRANSACTION COST AND SIZE

(71) Applicant: International Business Machines Corporation, Armonk, NY (US)

(72) Inventors: Pralhad Dinesh Deshpande, Singapore (SG); Muhammad Tayyab Asif, Singapore (SG); Alan Kang Hong Lim, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 16/004,826

(22) Filed: Jun. 11, 2018

(65) Prior Publication Data

US 2019/0378069 A1    Dec. 12, 2019

(51) Int. Cl.
*G06Q 10/06* (2012.01)

(52) U.S. Cl.
CPC ..... *G06Q 10/06315* (2013.01); *G06Q 10/067* (2013.01)

(58) Field of Classification Search
CPC ............. G06Q 30/0213; G06Q 2250/10
See application file for complete search history.

(56) References Cited

U.S. PATENT DOCUMENTS

| 7,353,212 | B1 | 4/2008 | Darcy et al. | |
| 10,884,810 | B1* | 1/2021 | Verma | H04L 67/02 |
| 10,986,177 | B2* | 4/2021 | Basu | H04L 9/0894 |
| 2015/0278802 | A1* | 10/2015 | Kansal | H04W 8/02 |
| | | | | 705/42 |
| 2015/0363782 | A1 | 12/2015 | Ronca et al. | |
| 2016/0342977 | A1 | 11/2016 | Lam | |
| 2017/0032338 | A1 | 2/2017 | Szollar | |
| 2017/0236123 | A1* | 8/2017 | Ali | G06Q 20/3825 |
| | | | | 705/75 |
| 2018/0089436 | A1* | 3/2018 | Smith | H04L 9/3236 |
| 2018/0109541 | A1 | 4/2018 | Gleichauf | |
| 2018/0183600 | A1* | 6/2018 | Davis | H04L 9/3239 |
| 2018/0218176 | A1* | 8/2018 | Voorhees | G06Q 20/02 |
| 2018/0247191 | A1* | 8/2018 | Katz | G06Q 20/065 |
| 2018/0262335 | A1* | 9/2018 | Bergner | H04L 9/0861 |
| 2018/0323963 | A1* | 11/2018 | Stollman | G06F 16/86 |
| 2018/0365686 | A1* | 12/2018 | Kondo | G06Q 20/382 |
| 2019/0012695 | A1* | 1/2019 | Bishnoi | G06Q 20/322 |

(Continued)

FOREIGN PATENT DOCUMENTS

WO    WO 2018204939 A1 *   11/2018

OTHER PUBLICATIONS

Insufficient Funds Error, StackExchange webpages, May 9, 2017 https://ethereum.stackexchange.com/questions/25856/insufficient-funds-error/25858 (Year: 2017).*

(Continued)

*Primary Examiner* — Octavian Rotaru

(57) ABSTRACT

An example operation may include one or more of receiving blockchain transactions, sorting an order of the blockchain transactions, simulating committance processing of the plurality of blockchain transactions to identify mining costs associated with each of the plurality of blockchain transactions, and applying one or more heuristic procedures to select one or more of the plurality of blockchain transactions which maximize a result associated with a next blockchain block.

12 Claims, 11 Drawing Sheets

(56) References Cited

U.S. PATENT DOCUMENTS

| | | | | |
|---|---|---|---|---|
| 2019/0013943 A1* | 1/2019 | Maim | | G06F 21/51 |
| 2019/0034926 A1* | 1/2019 | Davis | | G06Q 20/401 |
| 2019/0102338 A1* | 4/2019 | Tang | | G06F 9/30145 |
| 2019/0122317 A1* | 4/2019 | Hunn | | G06Q 20/223 |
| 2019/0123892 A1* | 4/2019 | Basu | | H04L 9/0637 |
| 2019/0155513 A1* | 5/2019 | Maeda | | G06F 3/0641 |
| 2019/0190896 A1* | 6/2019 | Singh | | G06F 21/62 |
| 2019/0199514 A1* | 6/2019 | Hari | | H04L 9/3239 |
| 2019/0253524 A1* | 8/2019 | Hoshizuki | | H04L 9/0637 |
| 2019/0281066 A1* | 9/2019 | Simons | | H04L 9/3226 |
| 2019/0289454 A1* | 9/2019 | Inoue | | H04L 9/0825 |
| 2019/0295336 A1* | 9/2019 | Jones | | G07C 5/085 |
| 2019/0318327 A1* | 10/2019 | Sowell | | H04L 63/123 |
| 2020/0007317 A1* | 1/2020 | Thompson | | H04L 9/0637 |
| 2020/0052917 A1* | 2/2020 | Corral | | H04L 65/4084 |
| 2020/0066391 A1* | 2/2020 | Sachdeva | | A61C 5/30 |
| 2020/0073698 A1* | 3/2020 | Wu | | G06F 16/2379 |
| 2020/0259634 A1* | 8/2020 | Wilke | | H03M 13/091 |
| 2020/0265037 A1* | 8/2020 | Bartolucci | | H04L 9/0643 |
| 2020/0357084 A1* | 11/2020 | Lerato Hunn | | H04L 9/32 |

OTHER PUBLICATIONS

Garcia-Banuelos, Luciano, et al, Optimized execution of business processes on blockchain, International conference on business process management, Springer, Cham, Aug. 10, 2017 https://link.springer.com/chapter/10.1007/978-3-319-65000-5_8 (Year: 2017).*

Wood Gavin, Ethereum, A secure decentralised generalised transaction ledger, Ethereum project yellow paper 151, No. 2014, pp. 1-32, 2014 http://gavwood.com/paper.pdf (Year: 2014).*

Andresen, G. (2012-2015) Reworking Bitcoin Transaction Fees. Retrieved at: https://gist.github.com/gavinandresen/2961409.

Andresen, G. (2015), Block size and miner fees . . . again. (re: Higher transaction fees for miners with one megabyte block limit). Retrieved at: http://gavinandresen.ninja/block-size-and-miner-fees-again.

Andresen, G.. (2015). Optimal fee strategies for miners, ("how big should miners make their blocks to maximize total fees paid?") Bitcoin Forum, United Bitcoin Community. Retrieved at: https://bitco.in/forum/threads/optimal-fee-strategies-for-miners.702/.

Are Transactions originating from one account mined in nonce order? (2016). Ethereum. Retrieved at: https://ethereum.stackexchange.com/questions/13376/are-transactions-originating-from-one-account-mined-in-nonce-order.

Cocco, L. & Marchesi, M. (2016). Modeling and Simulation of the Economics of Mining in the Bitcoin Market. PLoS One 2016, 11, e0164603. Retrieved at: https://doi.org/10.1371/journal.pone.0164603.

Draupnir, M. (2016). How do Bitcoin Mining Fees Work? ("Fees incentivize miners to include transactions in a block.") Bitcoin Mining, 2011-2017 Hesiod Services LLC. Retrieved at: https://www.bitcoinmining.com/bitcoin-mining-fees/.

How many transactions could be included in a new block from the same account? (2017). Ethereum. Retrieved at: https://ethereum.stackexchange.com/questions/13344/how-many-transactions-could-be-included-in-a-new-block-from-the-same-account/.

Lopp, J. (2016). The Challenges of Bitcoin Transaction Fee Estimation. Retrieved at: https://blog.bitgo.com/the-challenges-of-bitcoin-transaction-fee-estimation-e47a64a61c72.

Predicting Bitcoin Fees For Transactions. See "What are the fees shown here?", "Miners usually include transactions with the highest fee/byte first" Retrieved at: https://bitcoinfees.21.co/.

Transaction fees. Bitcoinwiki. Retrieved at: https://en.bitcoin.it/wiki/Transaction_fees.

* cited by examiner

BLOCK CREATION BASED ON TRANSACTION COST AND SIZE

TECHNICAL FIELD

This application generally relates to management of blockchain transactions, and more particularly, to using a procedure for maximizing retention of transaction results to block creators and other entities responsible for managing blockchain block creation.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Conventionally, the procedures for determining a set of blockchain transactions to include in a block are not setup for maximizing results on a block-by-block basis. The results are generated after certain tasks are performed from certain vendors, however, those transactions which are received and queued for committal and finalization to the blockchain generally follow a first-in-first-out approach and do not consider various known variables when organizing a new blockchain block. Miners and other finalization entities will continue competing for higher results and may not consider transaction management from certain entities if the results are known to be lesser than other entities. Also, miners do not have enough information to determine exactly what the transaction result is going to be before including that transaction in the block.

In one common blockchain model, a maximum amount of resources may be set for a transaction, and a resource price may be a user supplied value which is used to compute a total cost of processing the transaction. In this example, miners do not know a list of instructions that the current transaction will execute. The total cost=resources used multiplied by a resource price, where the resources used is the sum of all resources for all operations executed. Each operation in this example blockchain configuration is assigned a number as to how much of the resources will be consumed. As such, miners do not have enough information to determine the result prior to forming the block. Miners may know the price of resources but not the amount of resources spent on finalizing a transaction. If the miners knew the true costs of executing a transaction, the blocks which are subsequently formed could be populated with higher resulting transactions as compare to other available transactions at any given time.

Another example of mining in conventional blockchain configurations provides a method of sorting and separating a list of transactions by sender accounts and/or by transaction nonce (i.e., identification). The ordering is then completed, and the ordered results are merged back together by result, however, this approach generally only compares the lead transaction from each known account/nonce. This approach does not identify characteristics of each transaction individually in a manner that guarantees an accurate estimation of the result values associated with each of the transactions.

SUMMARY

One example embodiment may provide a method that includes one or more of receiving a plurality of blockchain transactions, sorting an order of the plurality of blockchain transactions, simulating committance processing of the plurality of blockchain transactions to identify mining costs associated with each of the plurality of blockchain transactions, and applying one or more heuristic procedures to select one or more of the plurality of blockchain transactions which maximize a result associated with a next blockchain block.

Another example embodiment may include an apparatus that includes a receiver configured to receive a plurality of blockchain transactions, and a processor configured to perform one or more of sort an order of the plurality of blockchain transactions, simulate committance processing of the plurality of blockchain transactions to identify mining costs associated with each of the plurality of blockchain transactions, and apply one or more heuristic procedures to select one or more of the plurality of blockchain transactions which maximize a result associated with a next blockchain block.

Yet another example embodiment may provide a non-transitory computer readable storage medium that stores instructions that when executed cause a processor to perform one or more of receiving a plurality of blockchain transactions, sorting an order of the plurality of blockchain transactions, simulating committance processing of the plurality of blockchain transactions to identify mining costs associated with each of the plurality of blockchain transactions, and applying one or more heuristic procedures to select one or more of the plurality of blockchain transactions which maximize a result associated with a next blockchain block.

DETAILED DESCRIPTION

Figure 1A:
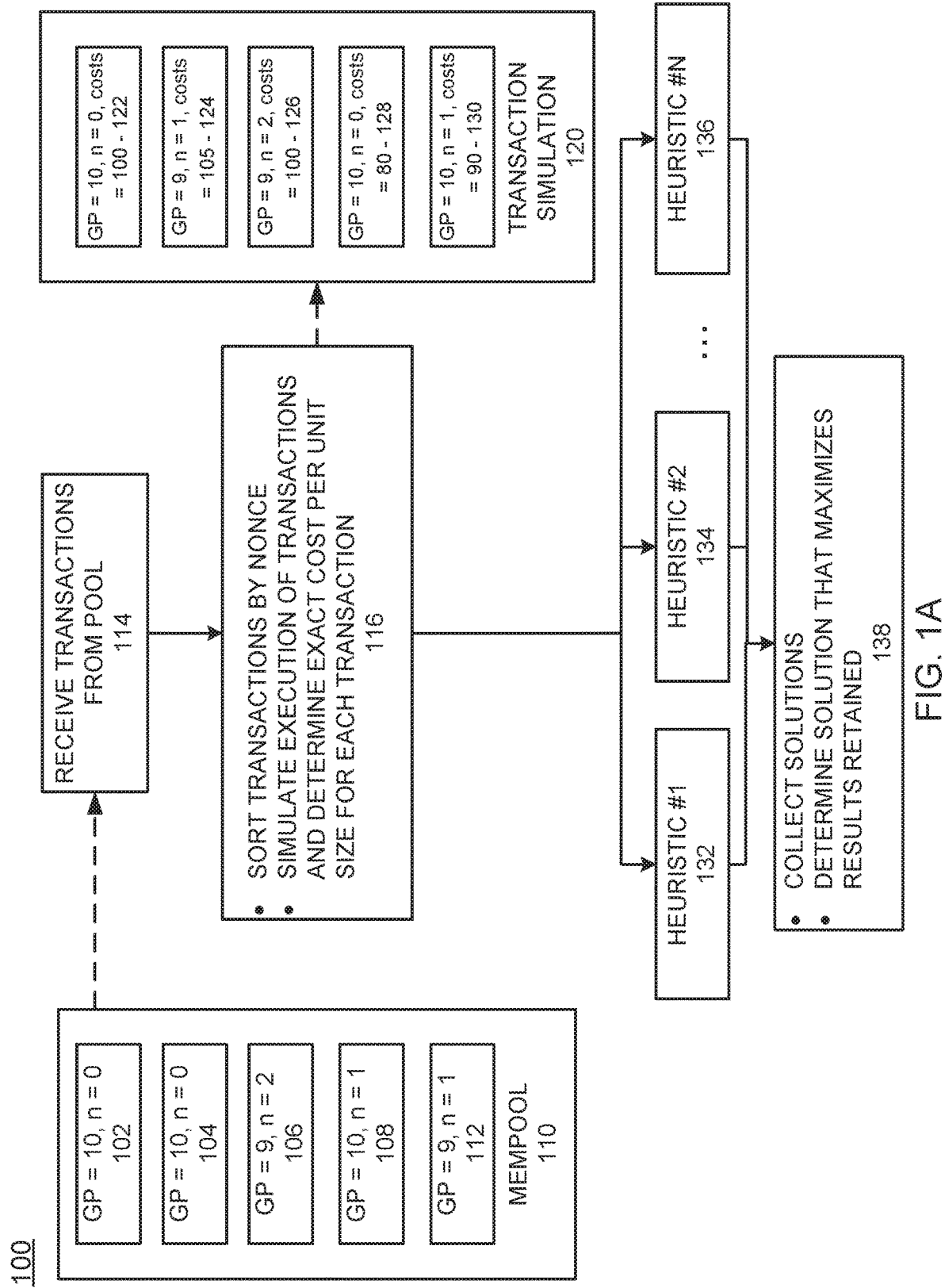
FIG. 1A illustrates a transaction organizing and cost/result determination procedure operating with a blockchain network, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide procedures for determining a set of transactions in a block which are more, less and modestly optimal and/or which results will be received for those specific transactions. The main two focus areas include the result received for mining a transaction and a corresponding block of transactions and the total cost (i.e., processing resources) for those transactions. The maximized optimal approach will have the highest result and the lowest cost.

In general, blockchain transactions which provide higher results per unit (kb) of data mined and prepared for blockchain commitment are preferentially included in current blocks as opposed to later blocks which may be offering lower resulting transaction results. Example embodiments also provide procedures for identifying available transactions and simulating the cost estimation and result calculations to identify the result of the total cost function, which is not generally known to miners prior to engaging in transaction processing. Various informational heuristics may be applied so that the optimal result may be determined prior to performing the block creation processes.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1A illustrates a transaction organizing and cost/result determination procedure operating with a blockchain network, according to example embodiments. Referring to FIG. 1A, the configuration 100 provides a memory pool 110 of transactions 102-112 which are currently available for mining/finalization and preparation for blockchain block creation and committance to the blockchain. The transactions in the memory pool are not ordered in any particular scheme. Once the transactions are identified and received 114 from the transaction pool via a computing device, the transactions may be sorted according to their nonce values, which may be tied to certain accounts or entities as members of the blockchain. The transactions can then be simulated for cost and result analysis. The cost analysis may be based on cost per unit size for each transaction 116. The transaction simulation 120 may include reordering the transactions 122-130 for a most optimal block creation for a next block in the blockchain. The heuristic approaches 132, 134 and 136 may be applied to assist with cost and result determinations prior to selecting the transactions for a next block. The solutions/results are processed and the next block can then be formed according to the optimal solution provided 138.

Figure 1B:
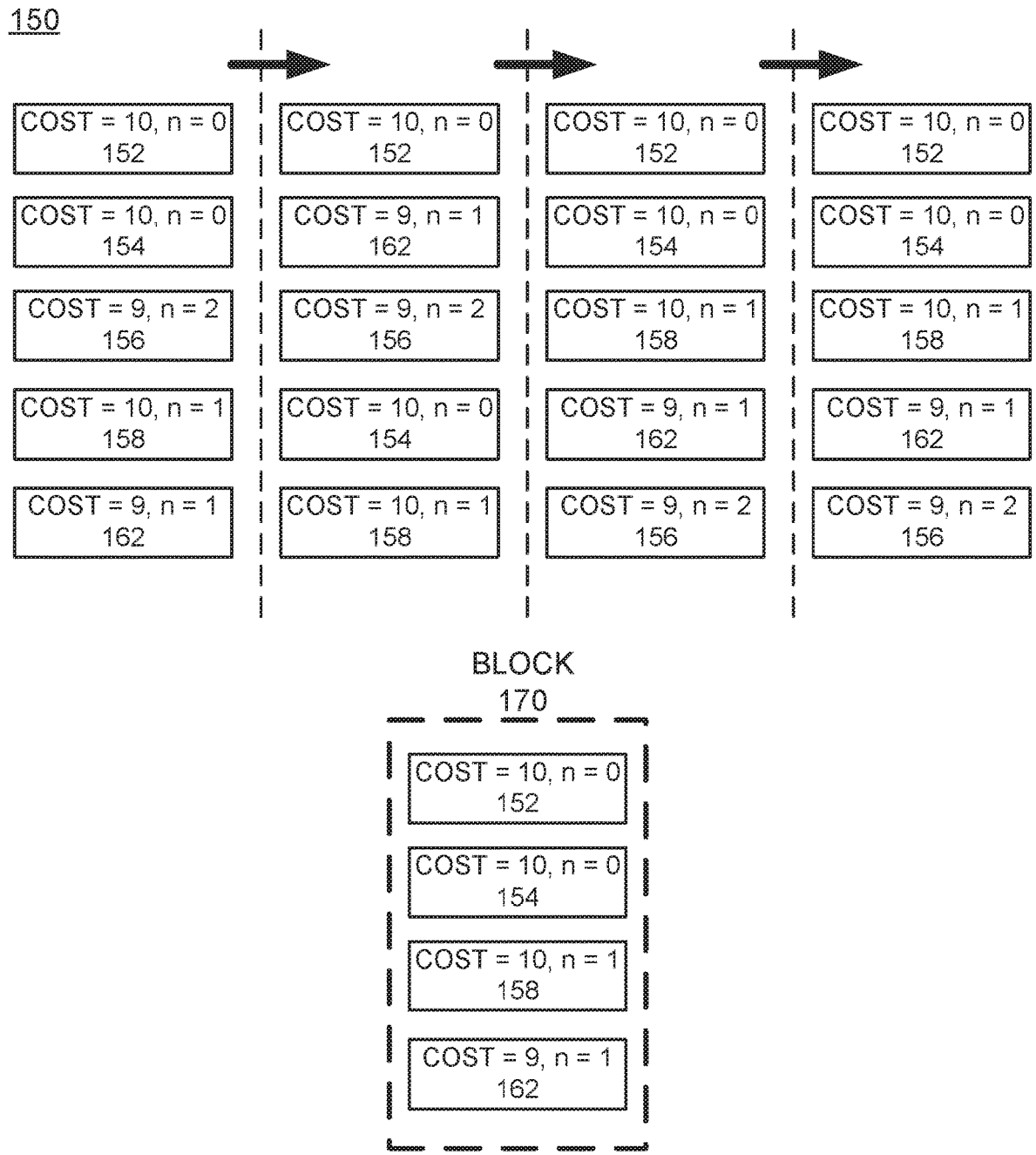
FIG. 1B illustrates a transaction organizing and block creation procedure operating with a blockchain network, according to example embodiments.

FIG. 1B illustrates a transaction organizing and block creation procedure operating with a blockchain network, according to example embodiments. Referring to FIG. 1B, the configuration 150 demonstrates reordering by nonce and cost, according to one heuristic approach to determining cost and result. The final result selected for the block 170 includes transactions 152, 154, 185 and 162, and transaction 156 was left out of this block cycle as the most optimal approach to cost and result dictated the transactions to include in the current block at this time. A block may have any number of transactions, and this example is provided to demonstrate the selection of transactions not a particular number of transactions in a block. As may be observed, the nonce values are selected along with cost estimates, however, other heuristics may be applied dynamically to select optimal blockchain transactions block creations procedures. For example, one, two or more heuristics may be applied to form a next block.

Figure 2A:
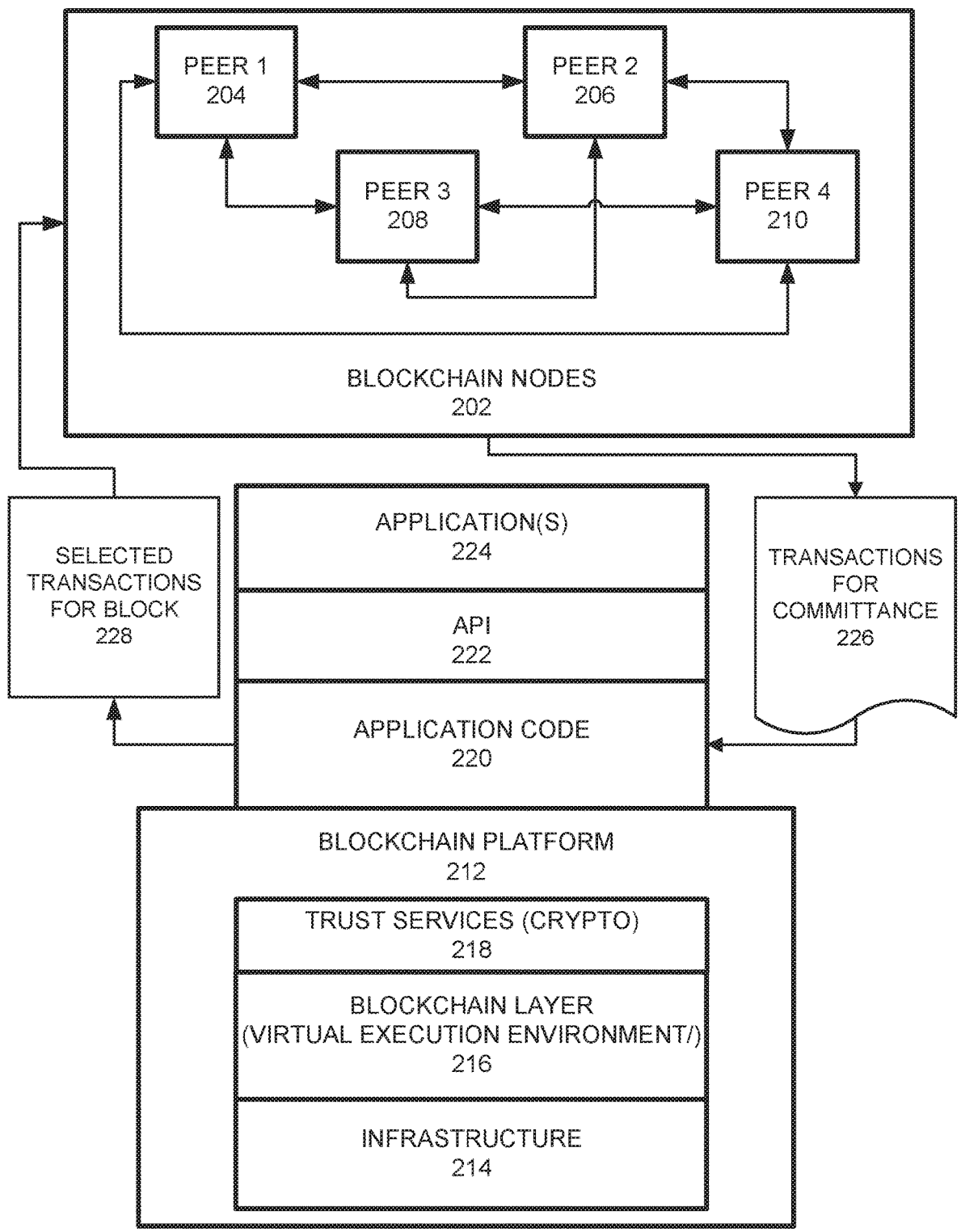
FIG. 2A illustrates an example peer node blockchain architecture configuration for performing blockchain modification operations, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the stored identifier and the hash created from the stored identifier template data match, then the chaincode sends an authorization key to the requested service. The chaincode may write to the blockchain data associated with the cryptographic details. In FIG. 2A, in one example, certain transactions are identified for miner operations and ultimately committance to the blockchain 226. Once the transactions are identified and the expected cost and result values are confirmed, the block creation operations may be executed to create a next block 228 based on the optimization heuristics applied to the transaction data.

Figure 2B:
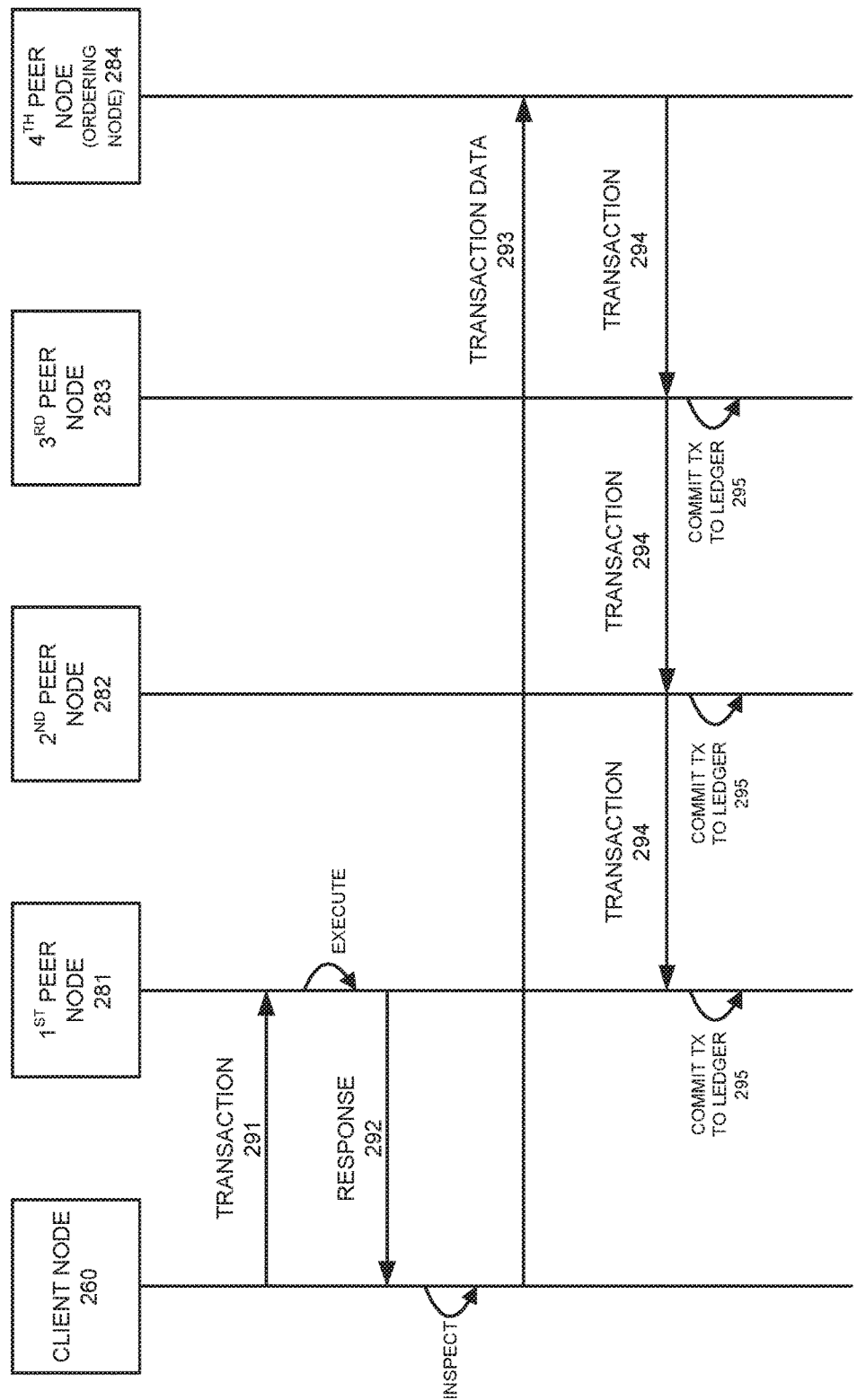
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
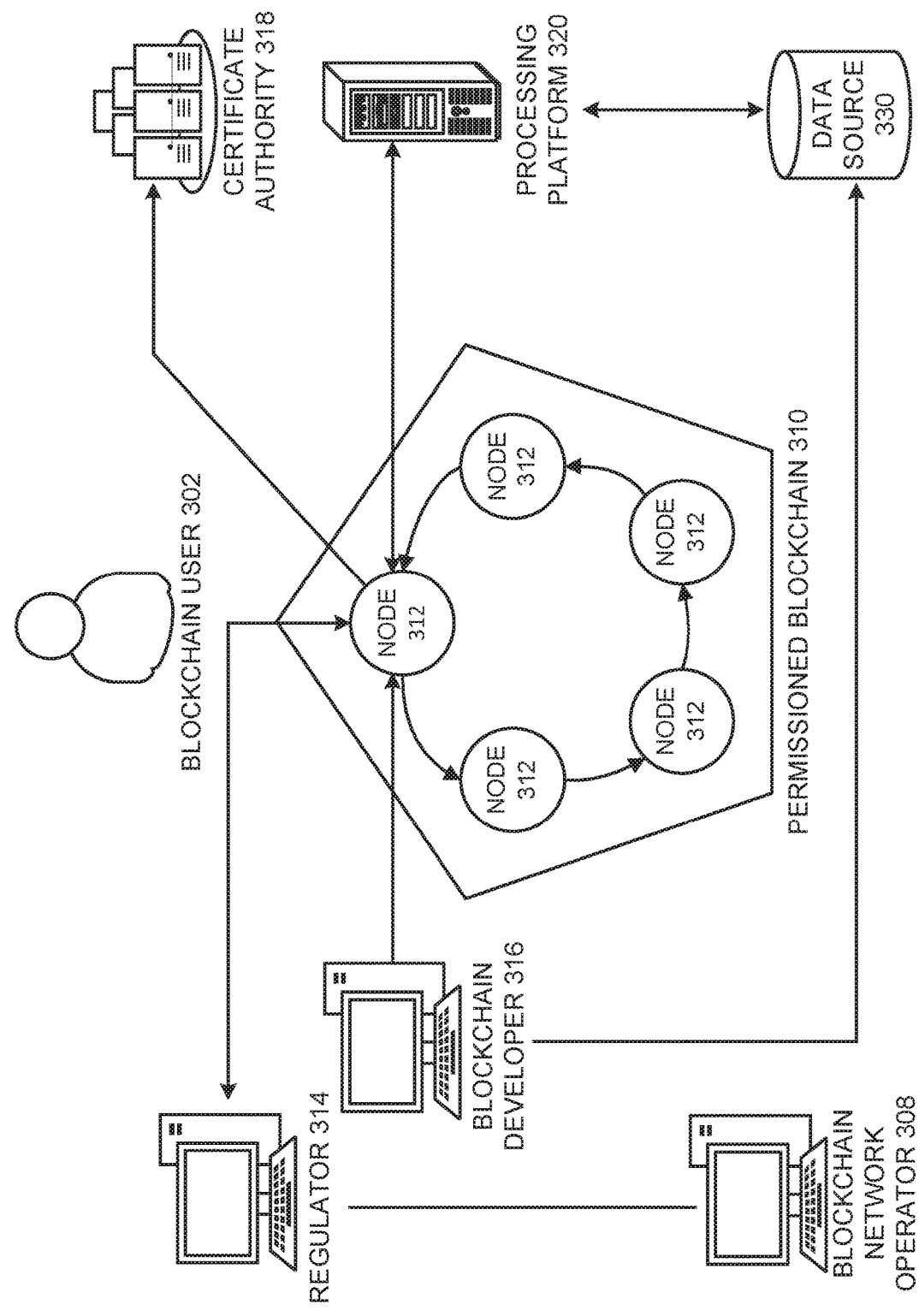
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
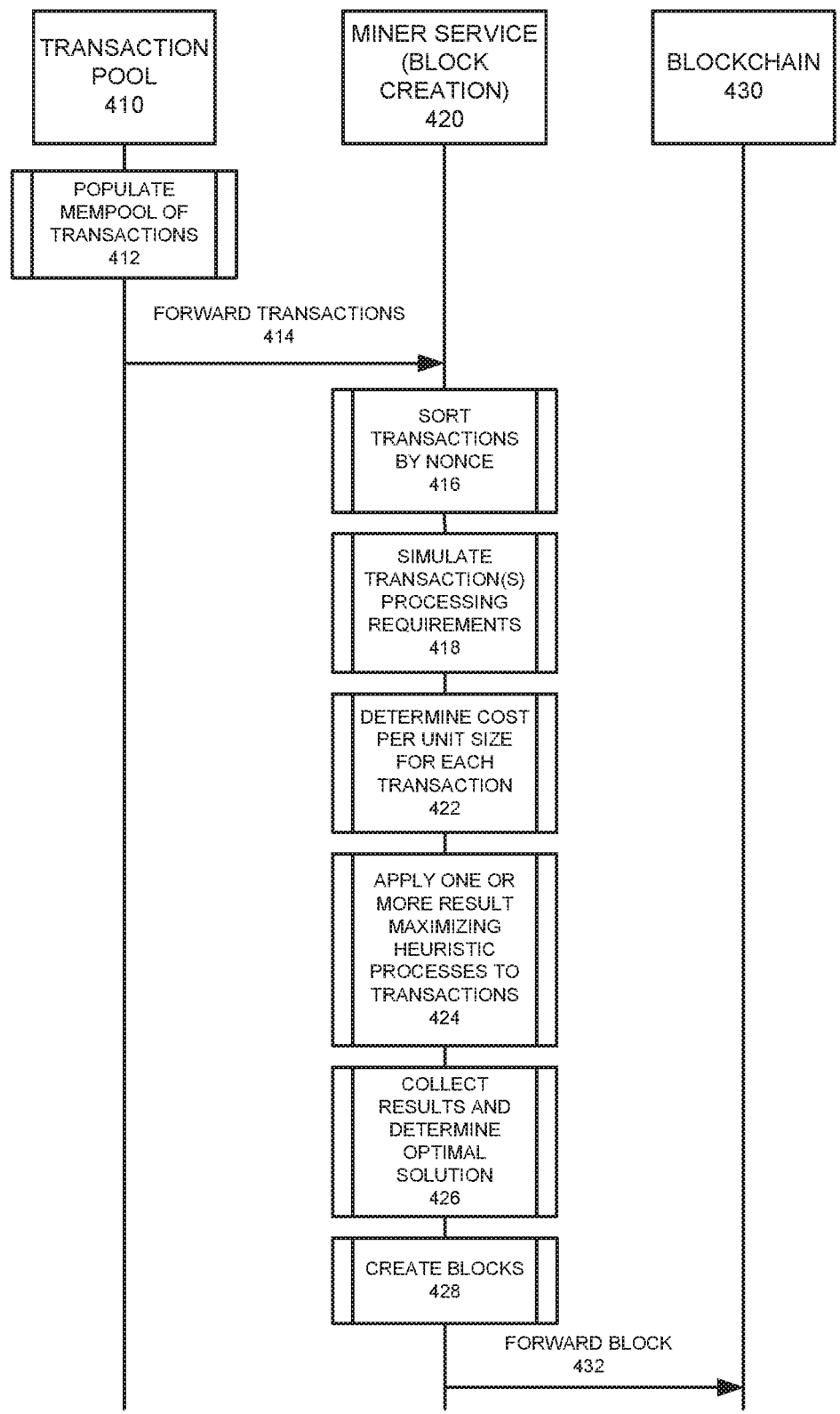
FIG. 4 illustrates a system messaging diagram for transaction organization and preparation for mining operations, according to example embodiments.

FIG. 4 illustrates a system messaging diagram for transaction organization and preparation for mining operations, according to example embodiments. Referring to FIG. 4, the system configuration 400 includes a memory pool or transaction pool 410 which is basically a queue of transactions 412 with no particular order or selection efforts applied to organize the transactions other than a first-in-first-out ordering scheme. The processing platform used by the miner service to create blocks 420 may sort the transactions multiple times according to heuristics applied to the transactions for optimization determination prior to block creation. The transactions may be forwarded 414 and sorted by nonce 416, and a simulation 418 may be used to determine the entities associated with the transactions, the size of the transactions, the results linked to the transactions for performing the mining effort, etc. The cost per unit size of the transactions may be determined to identify the time and processing requirements, CPU, memory, storage, etc., required to mine the transactions 422. The heuristics selected by the miner may be applied to finalize the sorted order of transactions 424 and to collect the optimal order 426 for block creation based on the selected transactions which will be used to include in next made block(s) 428. The blocks are then forwarded 432 to the blockchain 430 for committance.

When sorting the transactions, the lead or first transaction for a particular entity, identified by nonce or other values, may be the approach used to estimate costs and results for all transactions from that entity. Another approach may be to review two transactions per entity, or, to periodically check the results and costs for a particular entity while always identifying the size of the transactions for accurate mining estimation. A first heuristic applied to sorting and selecting the transactions for a block may be to determine cost per unit size, identify nonce values and order the transactions based on nonce, cost values and results. The computing entities may measure costs based on operational codes (OPCODES).

The OPCODES are linked to a number of compute cycles. So, if a particular OPCODE requires four compute cycles and another OPCODE requires 14 compute cycles then the cost may be four times a current market value of blockchain transaction value required to run a compute cycle. If the current market value is 0.1 then the cost of performing the first OPCODE operation is 4×0.1 and the cost of the second OPCODE is 14×0.1. Such determinations can provide an accurate estimation of processing costs to mine a transaction. Referring to transactions, the transactions are measured by size in kilobytes. The objective in performing the pre-processing screening of the transactions may provide a determination as to the cost per unit size, and thus transactions with optimal cost per unit sizes may be selected. Also, the nonce values assist with determining the transactions from an entity/client, which is also a consideration for block selection to help preserve ordering for transactions from those clients.

Another heuristic approach to screen transactions may include identifying a number of different accounts and their corresponding transactions. Some transactions may require a first amount of cost based on transaction size, others may have different transaction costs. In this particular heuristic approach, the operations may include, for each account T, generate cost per unit (in kb) cost_unit_i[n] for each nonce value n=1, 2 . . . , and S*=Set of transactions already picked. Initially empty. Next, while leftover blocksize>0 and un-picked transactions size<leftover blocksize: for each account i, pick cost_i_max=argmax n (cost_unit_i[n]). The option is selected with a maximum cost s*, and the feasibility of adding to the block is checked and s* is added to S* and the leftover block_size is updated. Examples of accounts with a number of transactions may include 1 (cost per kb for each transaction, size of transaction) with (3,2) for account A, (6,1) for account B and (2,2) for account C. The transactions included=1, 2 (cost per kb for each transaction, size of transaction) may include (8,3) for A, (9,5) for B and (8,3) for C. The transactions included=1, 2, 3 (cost per kb for each transaction, size of transaction) may provide (4,9) for A, (3,13) for B and (4,5) for C. The result of an example execution is a set of transactions={B: (9,5), A(3,2)1}, with a total cost=9*5+3*2=51. This example is provided merely to demonstrate different accounts, costs and transactions sizes and other values may be identified when performing heuristic analyses.

Another heuristic approach may include an optimal result and dynamic computation approach which provides:

Step 1.a: For each account i, generate cost per unit (in kb) cost_unit_i[n] for each nonce value n=1, 2 . . . .

S*=Set of transactions already picked. Initially empty

Step 2: While leftover blocksize>0 and un-picked transactions size<leftover blocksize:

Step 2.a: For each account i, pick cost_i_max=argmax n (cost_unit_i[n])

If (cost_i_max*k k_i) is not in the feasible set S*:
  add (cost_i_max*k k_i) to feasible set S, where k_i is the size of transactions till nonce n with unit cost cost_i_max Else:
  Regenerate cost_unit_i[n] for nonces greater than the picked transactions for that account
  Repeat step 2.a for that account Step 2.b:
  Find the optimal subset s* of S by running dynamic programming version of 1/0 knapsack problem
  Add s* to S*
  Update leftover block_size.

In this example, given the data from the last example with accounts A, B and C, the final optimal set is: {(A: (8,3)), (C: (8,3)), B: (6,1)1}, and a final cost=8×3+8×3+6×1=54.

Figure 5A:
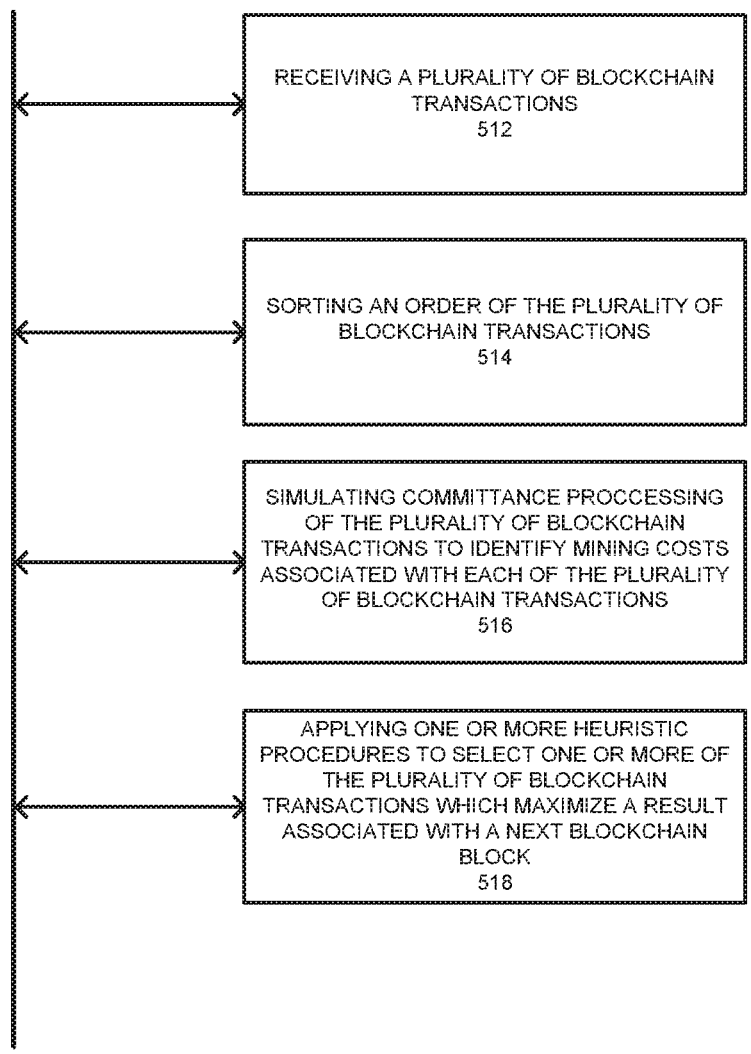
FIG. 5A illustrates a flow diagram of an example transaction organization and preparation procedure, according to example embodiments.

FIG. 5A illustrates a flow diagram of an example transaction organization and preparation procedure, according to example embodiments. Referring to FIG. 5A, the method 500 may include receiving a plurality of blockchain transactions 512, sorting an order of the plurality of blockchain transactions 514, simulating committance processing of the plurality of blockchain transactions to identify mining costs associated with each of the plurality of blockchain transactions 516, and applying one or more heuristic procedures to select one or more of the plurality of blockchain transactions which maximize a result associated with a next blockchain block 518.

In this example, the order of the plurality of blockchain transactions is determined by one or more of a nonce value of each of the plurality of blockchain transactions, a size of each of the plurality of blockchain transactions and a mining cost of each of the plurality of blockchain transactions. The mining cost is a function of resource requirements needed for preparing each of the plurality of blockchain transaction for committance to the blockchain. The method may also include determining the mining costs based on transaction data size for each of the plurality of blockchain transactions, and the one or more heuristic procedures include determining the mining costs and nonce values of each of the plurality of blockchain transactions. The one or more heuristic procedures further include selecting the one or more blockchain transactions from the plurality of blockchain transactions based on data sizes for each of the plurality of blockchain transactions, and selecting the one or more blockchain transactions for the next blockchain block based on a highest result value and a lowest mining cost associated with each of the one or more blockchain transactions.

Figure 5B:
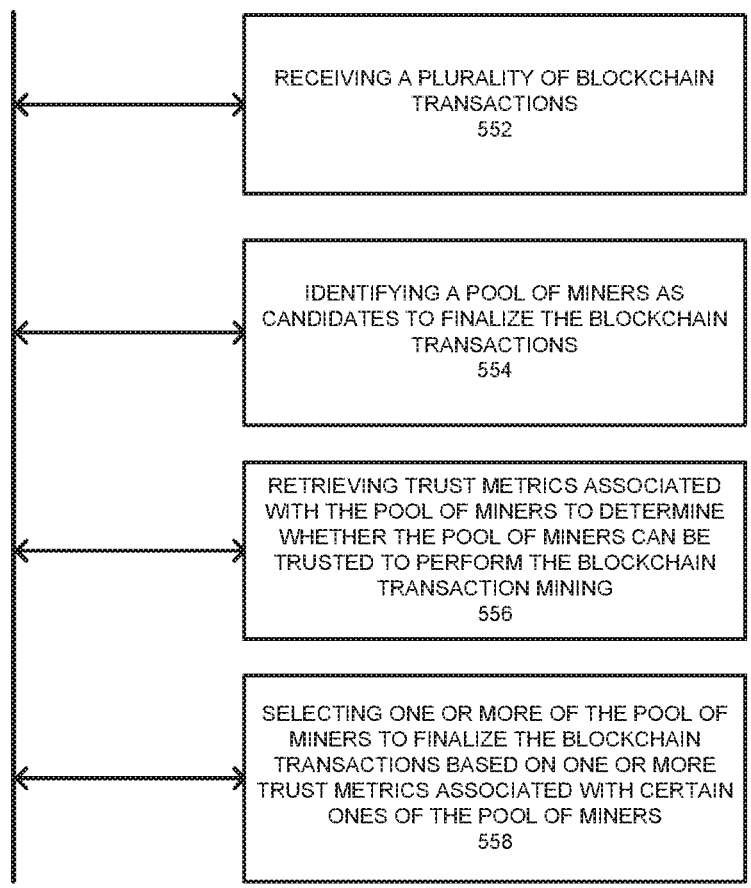
FIG. 5B illustrates a flow diagram of another example transaction organization and preparation procedure, according to example embodiments.

FIG. 5B illustrates a flow diagram of another example transaction organization and preparation procedure, according to example embodiments. Referring to FIG. 5B, the method 550 may include receiving a plurality of blockchain transactions 552, identifying a pool of miners as candidates to finalize the blockchain transactions 554, retrieving trust metrics associated with the pool of miners to determine whether the pool of miners can be trusted to perform the blockchain transaction mining 556, and selecting one or more of the pool of miners to finalize the blockchain transactions based on one or more trust metrics associated with certain ones of the pool of miners 558.

In addition to counting results and work costs to mine and finalize blockchain transactions, the miners may undergo a screening based on known trust metrics associated with one or more of the miners. For example, the miners may have consensus vote trusts, certifications, and other trust information linked to their profiles. Those metrics may be required in a pre-screening operation performed to ensure the miners are trusted prior to accepting or approving the miners to conduct the mining efforts. Once the trust metrics are identified, the miners may be accepted to perform the mining of certain transactions.

Figure 6A:
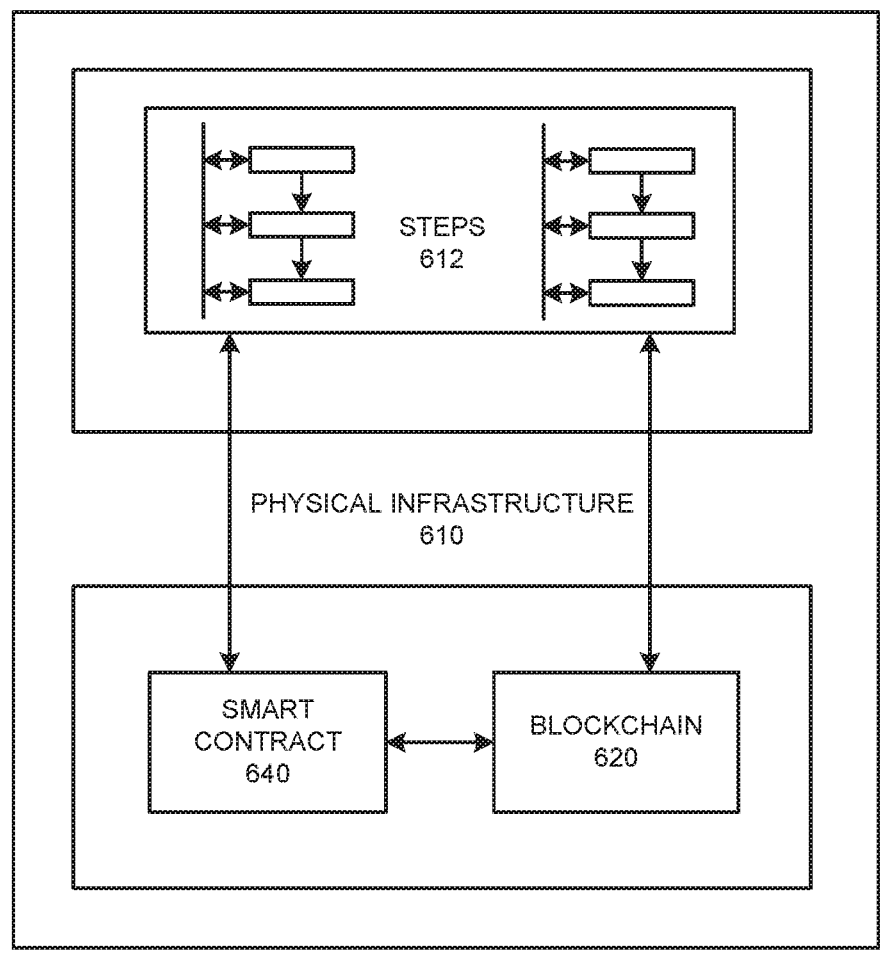
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600 includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
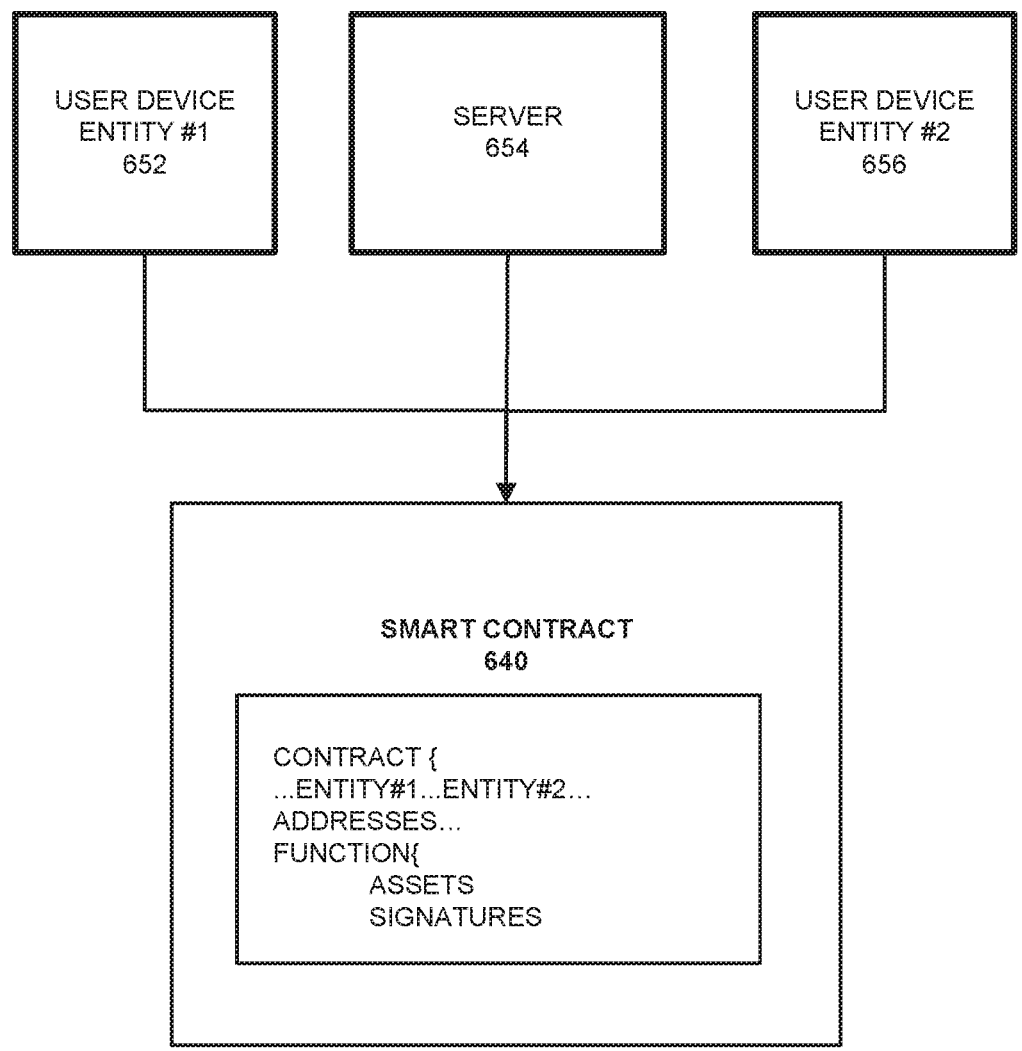
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
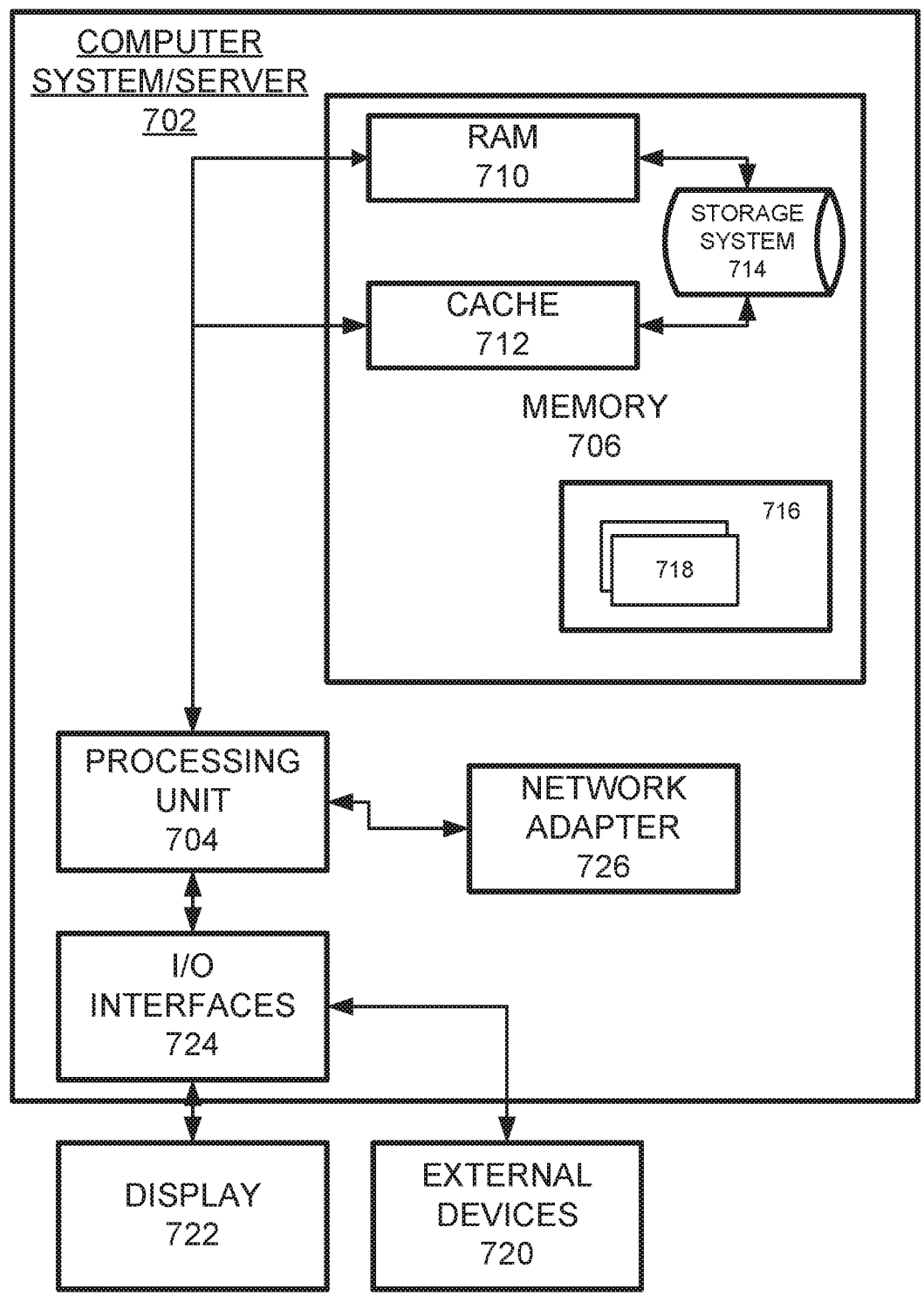
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method for creating and cryptographically matching a next blockchain block by reordering a plurality of blockchain transactions, the method comprising:
   receiving, by a hardware processor, a plurality of blockchain transactions from a memory pool;
   measuring, by the hardware processor based on heuristics, operational codes of a number of compute cycles for the plurality of blockchain transactions to determine a processing cost to mine the plurality of blockchain transactions;
   simulating, by the hardware processor, the plurality of blockchain transactions prior to committing the plurality of blockchain transactions and determining, for each blockchain transaction among the plurality of blockchain transactions, the processing cost and a size of data for each of the blockchain transactions to be committed to a blockchain based on the simulation;
   sorting, by the hardware processor, the plurality of blockchain transactions multiple times based on the heuristics applied to the blockchain transactions, and based on a nonce value of each of the plurality of blockchain transactions;
   identifying, by the hardware processor, based on the processing cost per the size of data for each of the plurality of blockchain transactions, resource requirements comprising: time requirements, computer processing requirements, and memory storage requirements to mine the plurality of blockchain transactions;
   optimizing, by the hardware processor, creation of the next blockchain block based on the heuristics applied to the plurality of blockchain transactions and by determining an order of the plurality of blockchain transactions according to one or more of the nonce value of each of the plurality of blockchain transactions, the data size for each of the plurality of blockchain transactions, and a mining cost of each of the plurality of blockchain transactions as a function of the resource requirements needed for preparing each of the plurality of blockchain transactions for committance to the blockchain;
   structuring, by the hardware processor, a transaction log as hash-linked blocks with a block header that includes a first cryptographic hash of the next blockchain block and another hash of a prior block's header to sequence and cryptographically link together the plurality of blockchain transactions;
   selecting, by the hardware processor, a particular blockchain transaction for the next blockchain block based on the data size for each of the plurality of blockchain transactions, a highest number of the number of compute cycles produced by the simulation, and a lowest mining cost associated with each of the blockchain transactions;
   reordering, by the hardware processor, the plurality of blockchain transactions based on the processing cost and the size of the data to be committed for each of the plurality of blockchain transactions based on the simulation;
   removing, by the hardware processor, at least one blockchain transaction from among the reordered plurality of blockchain transactions based on the processing cost and the size of data to be committed to the blockchain;
   creating, by the hardware processor, a block for the blockchain which includes non-removed transactions from the reordered plurality of blockchain transactions;
   receiving, by a chaincode, a first cryptographic hash of the next blockchain block which was most recently added to the blockchain;
   retrieving, by the chaincode from the blockchain, a second cryptographic hash created from a stored identifier template by use of a previously stored feature extractor;

sending, by the chaincode, an authorization key to a requested service, when the first cryptographic hash and the second cryptographic hash match each other; and writing, by the chaincode blockchain, data associated with cryptographic details of the first cryptographic hash and the second cryptographic hash.

2. The method of claim 1, further comprising: determining, by the hardware processor, the mining cost based on the data size for each of the plurality of blockchain transactions.

3. The method of claim 1, further comprising: applying, by the hardware processor, one or more additional heuristic procedures to the plurality of blockchain transactions.

4. The method of claim 3, wherein the one or more additional heuristic procedures comprise selecting, by the hardware processor, the at least one blockchain transaction.

5. A system for creating and cryptographically matching a next blockchain block by reordering a plurality of blockchain transactions, the system comprising:
a hardware processor configured to execute instructions comprising:
receiving, a plurality of blockchain transactions from a memory pool,
measuring, based on heuristics, operational codes of a number of compute cycles for the plurality of blockchain transactions to determine a processing cost to mine the plurality of blockchain transactions,
simulating, the plurality of blockchain transactions prior to committing the plurality of blockchain transactions and determining, for each blockchain transaction among the plurality of blockchain transactions, the processing cost and a size of data for each of the blockchain transactions to be committed to a blockchain based on the simulation,
sorting, the plurality of blockchain transactions multiple times based on the heuristics applied to the blockchain transactions, and based on a nonce value of each of the plurality of blockchain transactions,
identifying, based on the processing cost per the size of data for each of the plurality of blockchain transactions, resource requirements comprising: time requirements, computer processing requirements, and memory storage requirements to mine the plurality of blockchain transactions,
optimizing, creation of the next blockchain block based on the heuristics applied to the plurality of blockchain transactions and by determining an order of the plurality of blockchain transactions according to one or more of the nonce value of each of the plurality of blockchain transactions, the data size for each of the plurality of blockchain transactions, and a mining cost of each of the plurality of blockchain transactions as a function of the resource requirements needed for preparing each of the plurality of blockchain transactions for committance to the blockchain,
structuring, a transaction log as hash-linked blocks with a block header that includes a first cryptographic hash of the next blockchain block and another hash of a prior block's header to sequence and cryptographically link together the plurality of blockchain transactions,
selecting, a particular blockchain transaction for the next blockchain block based on the data size for each of the plurality of blockchain transactions, a highest number of the number of compute cycles produced by the simulation, and a lowest mining cost associated with each of the blockchain transactions,
reordering, the plurality of blockchain transactions based on the processing cost and the size of the data to be committed for each of the plurality of blockchain transactions based on the simulation,
removing, at least one blockchain transaction from among the reordered plurality of blockchain transactions based on the processing cost and the size of data to be committed to the blockchain, and
creating, a block for the blockchain which includes non-removed transactions from the reordered plurality of blockchain transactions; and
a chaincode executed by the hardware processor for:
receiving, a first cryptographic hash of the next blockchain block which was most recently added to the blockchain,
retrieving, a second cryptographic hash created from a stored identifier template by use of a previously stored feature extractor,
sending, an authorization key to a requested service, when the first cryptographic hash and the second cryptographic hash match each other, and
writing, data associated with cryptographic details of the first cryptographic hash and the second cryptographic hash.

6. The system of claim 5, wherein the hardware processor is configured to further execute instructions comprising:
determining the mining cost based on the data size for each of the plurality of blockchain transactions.

7. The system of claim 5, wherein the hardware processor is configured to further execute instructions comprising:
applying one or more additional heuristic procedures to the plurality of blockchain transactions.

8. The system of claim 7, wherein the one or more additional heuristic procedures comprise selecting the at least one blockchain transaction.

9. A non-transitory computer readable storage medium configured to store instructions that when executed by a hardware processor, cause the hardware processor to perform:
receiving, a plurality of blockchain transactions from a memory pool,
measuring, based on heuristics, operational codes of a number of compute cycles for the plurality of blockchain transactions to determine a processing cost to mine the plurality of blockchain transactions,
simulating, the plurality of blockchain transactions prior to committing the plurality of blockchain transactions and determining, for each blockchain transaction among the plurality of blockchain transactions, the processing cost and a size of data for each of the blockchain transactions to be committed to a blockchain based on the simulation,
sorting, the plurality of blockchain transactions multiple times based on the heuristics applied to the blockchain transactions, and based on a nonce value of each of the plurality of blockchain transactions,
identifying, based on the processing cost per the size of data for each of the plurality of blockchain transactions, resource requirements comprising: time requirements, computer processing requirements, and memory storage requirements to mine the plurality of blockchain transactions,
optimizing, creation of a next blockchain block based on the heuristics applied to the plurality of blockchain transactions and by determining an order of the plurality of blockchain transactions according to one or more of the nonce value of each of the plurality of blockchain transactions, the data size for each of the plurality of blockchain transactions, and a mining cost of each of the plurality of blockchain transactions as a function of the resource requirements needed for preparing each of the plurality of blockchain transactions for committance to the blockchain, structuring, a transaction log as hash-linked blocks with a block header that includes a first cryptographic hash of the next blockchain block and another hash of a prior block's header to sequence and cryptographically link together the plurality of blockchain transactions, selecting, a particular blockchain transaction for the next blockchain block based on the data size for each of the plurality of blockchain transactions, a highest number of the number of compute cycles produced by the simulation, and a lowest mining cost associated with each of the blockchain transactions, reordering, the plurality of blockchain transactions based on the processing cost and the size of the data to be committed for each of the plurality of blockchain transactions based on the simulation, removing, at least one blockchain transaction from among the reordered plurality of blockchain transactions based on the processing cost and the size of data to be committed to the blockchain, and creating, a block for the blockchain which includes non-removed transactions from the reordered plurality of blockchain transactions; and executing a chaincode for:
receiving, a first cryptographic hash of the next blockchain block which was most recently added to the blockchain,
retrieving, a second cryptographic hash created from a stored identifier template by use of a previously stored feature extractor,
sending, an authorization key to a requested service, when the first cryptographic hash and the second cryptographic hash match each other, and
writing, data associated with cryptographic details of the first cryptographic hash and the second cryptographic hash.

10. The non-transitory computer readable storage medium of claim 9, wherein the instructions are further executed by the hardware processor for:
determining the mining cost based on the data size for each of the plurality of blockchain transactions.

11. The non-transitory computer readable storage medium of claim 9, wherein the instructions are further executed by the hardware processor for:
applying one or more additional heuristic procedures to the plurality of blockchain transactions.

12. The non-transitory computer readable storage medium of claim 11, wherein the one or more additional heuristic procedures comprise selecting the at least one blockchain transaction.

* * * * *